United States Patent
Lee

(10) Patent No.: US 11,548,432 B2
(45) Date of Patent: *Jan. 10, 2023

(54) APPARATUS FOR EMITTING ROAD SURFACE INFORMATION AND METHOD THEREOF

(71) Applicant: HYUNDAI MOBIS CO., LTD., Seoul (KR)

(72) Inventor: Deuk Gyu Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/554,500

(22) Filed: Dec. 17, 2021

(65) Prior Publication Data

US 2022/0169171 A1    Jun. 2, 2022

Related U.S. Application Data

(63) Continuation of application No. 17/136,537, filed on Dec. 29, 2020, now Pat. No. 11,230,223.

(30) Foreign Application Priority Data

Nov. 30, 2020  (KR) ......................... 10-2020-0164978

(51) Int. Cl.
  *B60Q 1/08* (2006.01)
(52) U.S. Cl.
  CPC ............ *B60Q 1/08* (2013.01); *B60Q 2300/32* (2013.01); *B60Q 2300/45* (2013.01)
(58) Field of Classification Search
  CPC .................................. B60Q 1/08; B60Q 1/085
  See application file for complete search history.

(56) References Cited

U.S. PATENT DOCUMENTS

| 2014/0267415 A1 | 9/2014 | Tang |
| 2018/0251064 A1 | 9/2018 | Vision |

FOREIGN PATENT DOCUMENTS

| JP | 2010-023677 A | 2/2010 |
| JP | 2015-527253 A | 9/2015 |
| JP | 2020-075719 A | 5/2020 |
| KR | 101770642 B1 | 9/2017 |

(Continued)

OTHER PUBLICATIONS

Office Action dated Mar. 10, 2022 issued for the KR Priority Application No. 10-2020-0164978.

(Continued)

*Primary Examiner* — Robert J May
(74) *Attorney, Agent, or Firm* — NovoTechIP International PLLC

(57) ABSTRACT

A vehicle system device is provided. The vehicle system device includes a headlamp, a storage storing information about a height where the headlamp is mounted and a left and right distance, and a controller. The controller includes a road surface information generator that generates road surface information corresponding to a sensor signal, a coordinate converter that obtains location coordinates of the road surface information and converts the location coordinates into angle coordinates based on the information stored in the storage, and a headlamp controller that controls the headlamp to emit the road surface information based on the angle coordinates. In addition, various embodiments recognized through the specification are possible.

13 Claims, 11 Drawing Sheets

(56) References Cited

FOREIGN PATENT DOCUMENTS

KR      101846328 B1    4/2018
WO      2017050986 A1   3/2017

OTHER PUBLICATIONS

"European Search Report Issued in European Paent Application No. 20217552.7", dated Jun. 22, 2021.
Decision of Registration dated Jul. 12, 2022 issued for the corresponding Japanese patent application No. 2021-036248.

APPARATUS FOR EMITTING ROAD SURFACE INFORMATION AND METHOD THEREOF

CROSS-REFERENCE TO RELATED APPLICATION

This application is a continuation of co-pending U.S. patent application Ser. No. 17/136,537, titled "APPARATUS FOR EMITTING ROAD SURFACE INFORMATION AND METHOD THEREOF," filed on Dec. 29, 2020, which claims the benefit of priority to Korean Patent Application No. 10-2020-0164978, filed in the Korean Intellectual Property Office on Nov. 30, 2020, the entire content of which is incorporated herein by reference.

TECHNICAL FIELD

The present disclosure relates to technologies of emitting road surface information.

BACKGROUND

With the development of technology, vehicles have not driven any longer depending on only manipulation of their drivers. An autonomous vehicle technology is the purpose of allowing a vehicle to travel by minimizing determination of a driver of the vehicle using sensing and artificial intelligence technologies. As an example, an autonomous vehicle may control intensity, brightness, or a direction of light emitted from its headlamp without intervention of the driver.

SUMMARY

A vehicle may emit light such that information having a specific shape, which is included in a headlamp, is indicated on a road surface (or a road). Such road surface information may indicate a variety of information based on a state of the vehicle or an external environment. For example, the road surface information may indicate a driving signal (e.g., a left turn, a right turn, or stop) of the vehicle, a shape indicating an obstacle detected on the road, or information guiding the vehicle to travel. The road surface information may be represented as a character or a picture.

Because the road surface information may be emitted in a distorted state according to a location of a headlamp mounted on the vehicle, a size of the vehicle, or a state of a road surface, there is a need to control the road surface information to be accurately displayed. When a hardware configuration of the headlamp is improved, costs according to the improvement may be increased.

The present disclosure has been made to solve the above-mentioned problems occurring in the prior art while advantages achieved by the prior art are maintained intact.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle system device may include a headlamp, a storage storing information about a height where the headlamp is mounted and a left and right distance of the headlamp, and a controller. The controller may include a road surface information generator that generates road surface information corresponding to a sensor signal, a coordinate converter that obtains location coordinates of the road surface information and converts the location coordinates into angle coordinates based on the information stored in the storage, and a headlamp controller that controls the headlamp to emit the road surface information based on the angle coordinates.

According to another aspect of the present disclosure, a method of a vehicle system device may include generating road surface information corresponding to a sensor signal, obtaining location coordinates of the road surface information, converting the location coordinates into angle coordinates based on a height where a headlamp of the vehicle system device is mounted and a left and right distance of the headlamp, and controlling the headlamp to emit the road surface information based on the angle coordinates.

BRIEF DESCRIPTION OF THE DRAWINGS

The above and other objects, features and advantages of the present disclosure will be more apparent from the following detailed description taken in conjunction with the accompanying drawings.

Figure 1:
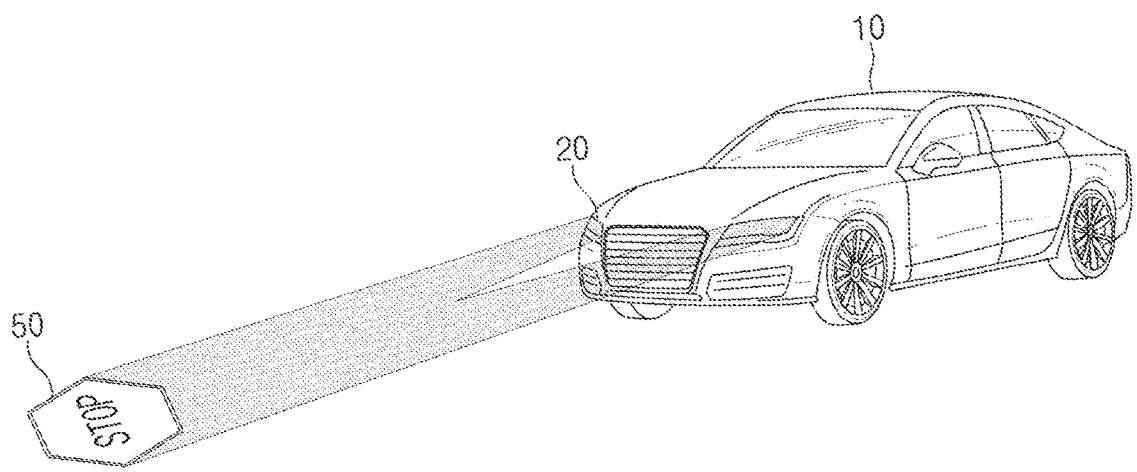
FIG. 1 illustrates an operation environment displaying road surface information using a headlamp according to various embodiments.

With regard to description of drawings, the same or similar denotations may be used for the same or similar components.

DETAILED DESCRIPTION

Hereinafter, various embodiments of the disclosure may be described with reference to accompanying drawings. However, it should be understood that this is not intended to limit the present disclosure to specific implementation forms and includes various modifications, equivalents, and/or alternatives of embodiments of the present disclosure.

Various embodiments of the present disclosure and terms used therein are not intended to limit the technical features described in the present disclosure to particular embodiments, and it should be construed as including various modifications, equivalents, or alternatives of a corresponding embodiment. With regard to description of drawings, similar denotations may be used for similar or related components. A singular form of a noun corresponding to an item may include one item or a plurality of the items, unless context clearly indicates otherwise. As used herein, each of the expressions "A or B," "at least one of A and B," "at least one of A or B," "A, B, or C," "at least one of A, B, and C," and "at least one of A, B, or C," may include any and all combinations of one or more of the items listed together with a corresponding expression among the expressions. Tams as "1st" and "2nd," or "first" and "second" may be used to distinguish a corresponding component from another, and do not limit the components in another aspect (e.g., importance or order). If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" used in various embodiments of the present disclosure may include a unit implemented in hardware, software, or firmware, and may be interchangeably used with other terms, such as "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

Various embodiments of the present disclosure may be implemented as software (e.g., a program) including instructions that are stored in a machine-readable storage medium (e.g., an internal memory or an external memory). For example, the machine may invoke at least one of one or more instructions stored in the storage medium and may execute the invoked instruction. This may allow the machine to be operated to perform at least one function depending on the at least one invoked instruction. The one or more instructions may contain a code made by a compiler or a code executable by an interpreter. The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semipermanently stored in the storage medium and where data is temporarily stored in the storage medium.

According to an embodiment, a method according various embodiments disclosed in the present disclosure may be included and provided in a computer program product. The computer program product may be traded as commodities between sellers and buyers. The computer program product may be distributed in the form of a machine-readable storage medium (e.g., a compact disc read only memory (CD-ROM)) or may be distributed (e.g., downloaded or uploaded) directly or online through an application store or between two user devices. When distributed online, at least part of the computer program product may be at least temporarily stored in a machine-readable storage medium, such as a memory of the manufacturer's server, a server of the application store, or a relay server, and may be temporarily generated.

According to various embodiments, each (e.g., a module or program) of the above-mentioned components may include a single entity or a plurality of entities, and some of the plurality of entities may be separately arranged in another component. According to various embodiments, one or more components of the above-mentioned components or operations may be omitted, or one or more other components or operations may be added. Alternatively or additionally, the plurality of components (e.g., modules or programs) may be integrated into one component. In such a case, the integrated component may one or more functions of each of the plurality of components to be the same or similar to being performed by a corresponding component of the plurality of components before the integration. According to various embodiments, operations performed by modules, programs, or other components may be carried out sequentially, in parallel, repeatedly, or heuristically, or at least one or more of the operations may be executed in a different order or omitted, or other operations may be added.

FIG. 1 illustrates an operation environment displaying road surface information using a headlamp according to various embodiments.

Referring to FIG. 1, a vehicle 10 may emit various types of road surface information 50 on a road surface (or a road) using a headlamp 20. The road surface information 50 may include at least one of an image or a text. The vehicle 10 may emit the road surface information 50 to notify a pedestrian or a driver of another vehicle of a state of the vehicle 10 or provide a driver of the vehicle 10 with a guide of driving. For example, the road surface information 50 may indicate information such as a turn signal, a warning light, a speed limit, a fuel gauge, a crosswalk, or a road state. To emit the road surface information 50, the vehicle 10 may control the headlamp 20 for each pixel making up the headlamp 20. For example, by applying a pixel value (e.g., YUV) to each of a plurality of pixels included in the headlamp 20, the vehicle 10 may emit the desired type of road surface information 50.

Figure 2:
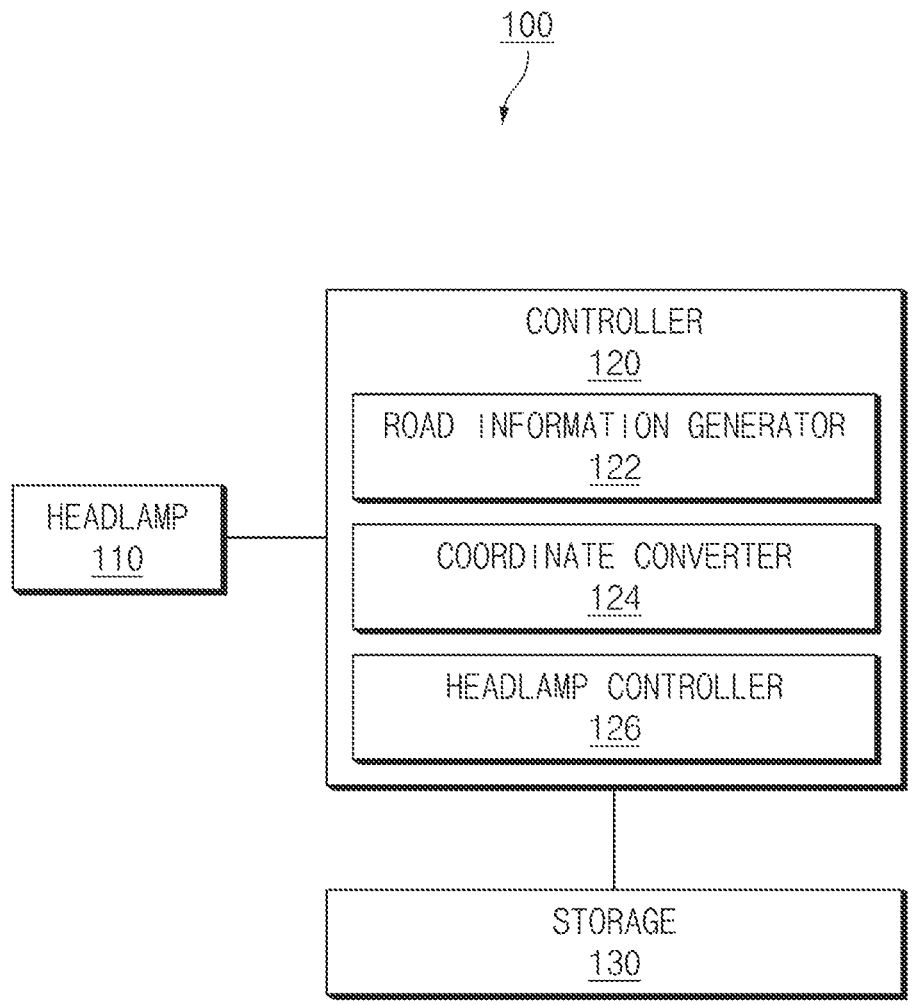
FIG. 2 is a functional block diagram of a vehicle system device according to various embodiments.

FIG. 2 is a functional block diagram of a vehicle system device according to various embodiments.

Referring to FIG. 2, a vehicle system device 100 may include a headlamp 110, a controller 120, and a storage 130. According to other embodiments, the vehicle system device 100 may exclude at least some (e.g., the headlamp 110 or the storage 130) among the components shown in FIG. 2 or may further include another component (e.g., a communication interface or a sensor) which is not shown in FIG. 2. The components included in the vehicle system device 100 may refer to software (e.g., a program) implemented by instructions as well as hardware components.

The headlamp 110 may be configured to emit light. The headlamp 110 may include a light source for emitting light, a reflector (e.g., a micro-mirror) for reflecting the light emitted from the light source, and a lens for emitting the reflected light to a road surface. The headlamp 110 may be formed of a plurality of pixels. The controller 120 (or a headlamp controller 126) may adjust at least one of a shape, a brightness, or an emitted angle of road surface information using a pixel value of each of the pixels.

The controller 120 may execute, for example, software (e.g., a program) to control at least one other component (e.g., a hardware or software component) of the vehicle system device 100 connected to the controller 120 and may perform a variety of data processing or calculation. According to an embodiment, as at least a part of data processing or calculation, the controller 120 may store commands or data received from another component (e.g., the sensor) in a volatile memory (e.g., the storage 130), may process the commands or data stored in the volatile memory, and may store result data in a non-volatile memory (e.g., the storage 130). According to an embodiment, the controller 120 may include a main processor (e.g., a central processing unit or an application processor) or an auxiliary processor (e.g., a graphic processing unit, an image signal processor, a sensor hub processor, a communication processor) operable independently or together with it. For example, the auxiliary processor may be configured to, when the controller 120 includes the main processor and the auxiliary processor, use lower power than the main processor or specialize in a specified function. The auxiliary processor may be implemented independently of the main processor or as a part thereof.

According to embodiments, the controller 120 may include a road surface information generator 122, a coordinate converter 124, and the headlamp controller 126. Each component included in the controller 120 may be a hardware device or a software program or may be in the form of combining them. The road surface information generator 122 may generate road surface information corresponding to a sensor signal. The sensor signal may be obtained from, for example, at least one sensor (not shown) included in the vehicle system device 100. The road surface information generator 122 may identify whether there is an image of the road surface information corresponding to the sensor signal and may generate the road surface information when there is the image of the road surface information. The coordinate converter 124 may convert location coordinates of the road surface information generated from the road surface information generator 122 into angle coordinates to correct intensity or a direction of light emitted from the headlamp 110. For example, the coordinate converter 124 may convert the location coordinates of the road surface information into the angle coordinates using a height where the headlamp 110 is mounted and a left and right distance of the headlamp 110. The coordinate converter 124 may store the converted angle coordinates in the storage 130 or may directly deliver the converted angle coordinates to the headlamp controller 126. The headlamp controller 126 may control the headlamp 110 using the angle coordinates to emit the corrected road surface information. In this case, the headlamp controller 126 may determine a pixel value of each of pixels of a pixel angle coordinate system depending on the angle coordinates.

According to embodiments, the road surface information generator 122, the coordinate converter 124, and the headlamp controller 126 may be formed as one integrated module. On the other hand, the road surface information generator 122, the coordinate converter 124, and the headlamp controller 126 may be separate components, respectively. For example, a user of the vehicle system device 100 may upgrade only some (e.g., the coordinate converter 124) among the components of the controller 120, thus improving accuracy of a technology of controlling the headlamp 110 without additional costs.

The storage 130 may store instructions controlling the vehicle system device 100, a control instruction code, control data, or user data. For example, the storage 130 may include at least one of an application program, an operating system (OS), middleware, or a device driver. The storage 130 may include one of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like. The storage 130 may further include a non-volatile medium such as a hard disk drive (HDD), a solid state disk (SSD), an embedded multi media card (eMMC), or a universal flash storage (UFS).

According to embodiments, the storage 130 may store a value for a height where the headlamp 110 is mounted or a left and right distance between two headlamps. For another example, the storage 130 may store an image of road surface information. For another example, the storage 130 may store the angle coordinates converted by the coordinate converter 124.

Figure 3:
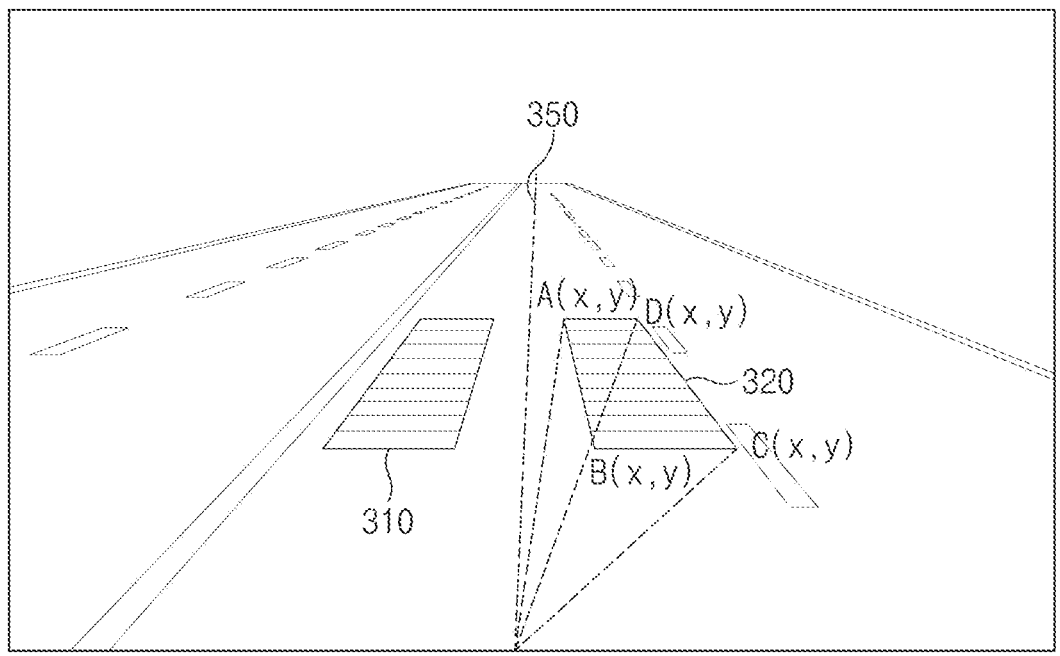
FIG. 3 illustrates location coordinates of road surface information according to various embodiments.

FIGS. 3 to 6 illustrate an operation of converting location coordinates of road surface information into angle coordinates. Hereinafter, a description will be given of an example of converting location coordinates of road surface information 320 emitted to the right into angle coordinates, but a similar principle is applicable to an embodiment of converting location coordinates of road surface information 310 emitted to the left into angle coordinates. Furthermore, FIG. 3 illustrates an example of emitting the road surface information 310 and 320 before correction on the road for convenience of description, but a vehicle system device 100 of FIG. 2 may correct distortions of the road surface information 310 and 320 without directly emitting the road surface information 310 and 320 on the road.

Referring to FIG. 3, a road surface information generator 122 of the vehicle system device 100 may generate the road surface information 310 and 320 corresponding to a sensor signal. FIG. 3 illustrates the road surface information 310 and 320 emitted separately by a left unit and a right unit of a headlamp 110 of FIG. 2, but, as shown in FIG. 1, the same principle is applicable to road surface information 50 indicating one image.

A coordinate converter 124 of FIG. 2 may obtain location coordinates of any points (e.g., vertices A, B, C, and D) configuring the road surface information 320. The obtained location coordinates may be represented as, for example, coordinates (X, Y) on an orthogonal coordinate system. In this case, a central location of the left and right headlamps may correspond to the origin. Vertices A and D may be locations more spaced apart from the headlamp 110 than vertices B and C, and a Y value of vertices A and D may be larger than a Y value of vertices B and C. Vertices C and D may be more outer locations than vertices A and B with respect to the center 350 of the left and right headlamps, and an X value of vertices C and D may be larger than an X value of vertices A and B.

Figure 4:
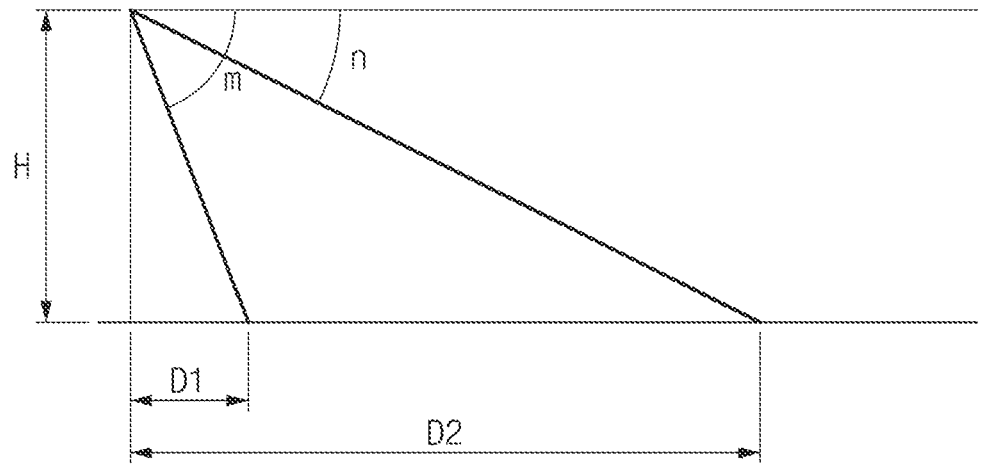
FIG. 4 illustrates a parameter for calculating angle coordinates of road surface information according to various embodiments.

Referring to FIG. 4, the coordinate converter 124 may calculate first angle coordinates (m, n) based on a height H where the headlamp 110 is mounted and location coordinates of the road surface information 320 For example, the coordinate converter 124 may calculate the first angle coordinate m using a Y-axis distance of vertices B and C and may calculate the first angle coordinate n using a Y-axis distance of vertices A and D. In this case, the first angle coordinates (m, n) may be calculated based on Equation 1 below.

$$m = \tan^{-1}(H/A(y)) \qquad \text{[Equation 1]}$$
$$n = \tan^{-1}(H/B(y))$$

In Equation 1 above, A(y) indicating the Y-axis distance D2 of vertex A may be replaced with D(y) indicating the Y-axis distance D2 of vertex D, and B(y) indicating the Y-axis distance D1 of vertex B may be replaced with B(y) indicating the Y-axis direction D1 of vertex C.

Figure 5:
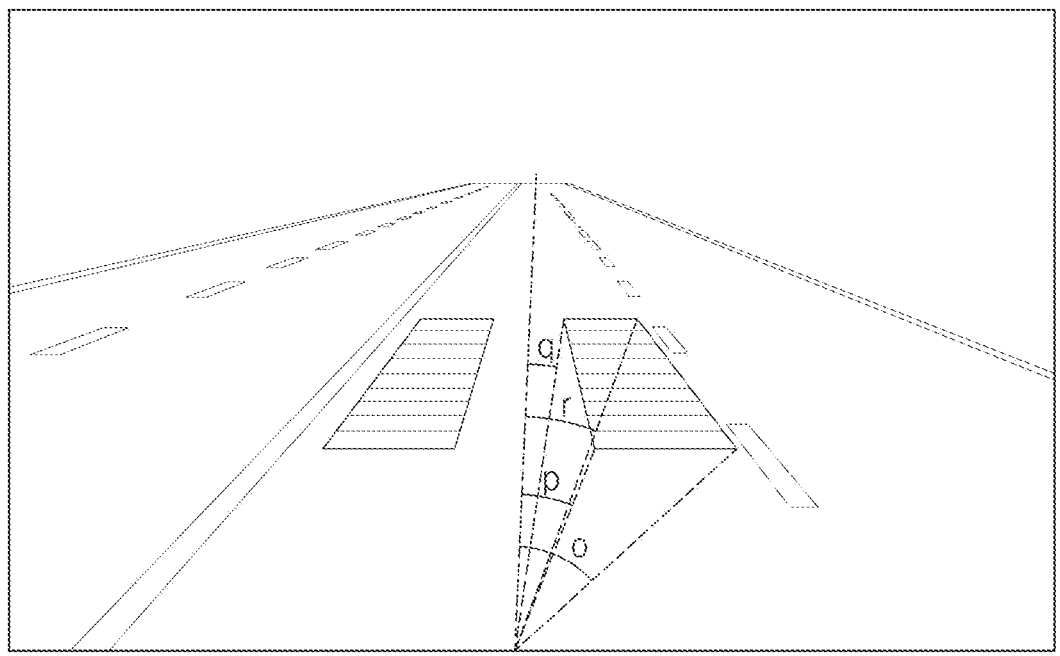
FIG. 5 illustrates angle coordinates of road surface information according to various embodiments.

Referring to FIG. 5, the coordinate converter 124 may calculate second angle coordinates (q, p, o, r) based on a distance 2S between the left and right headlamps and location coordinates of the road surface information 320. For example, the coordinate converter 124 may calculate the second angle coordinate q using an X-axis distance and a Y-axis distance of vertex A and a ½ value S of the distance between the left and right headlamps, and may calculate the second angle coordinate p of vertex B, the second angle coordinate o of vertex C, and the second angle coordinate r of vertex D in the same principle. The second angle coordinates (q, p, o, r) may be calculated based on Equation 2 below.

$$q = \tan^{-1}(A(x) - S)/A(y)$$
$$p = \tan^{-1}(B(x) - S)/B(y)$$
$$o = \tan^{-1}(C(x) - S)/C(y)$$
$$r = \tan^{-1}(D(x) - S)/D(y)$$

[Equation 2]

In Equation 2 above, the coordinate converter 124 may subtract the S value (−S) from an X-axis location coordinate (e.g., A(x)) of each vertex to calculate the second angle coordinates of the road surface information 320 emitted to a location of a right headlamp unit, but may add the S value (+S) when calculating the second angle coordinates of the road surface information 310 emitted to a location of a left headlamp unit.

Figure 6:
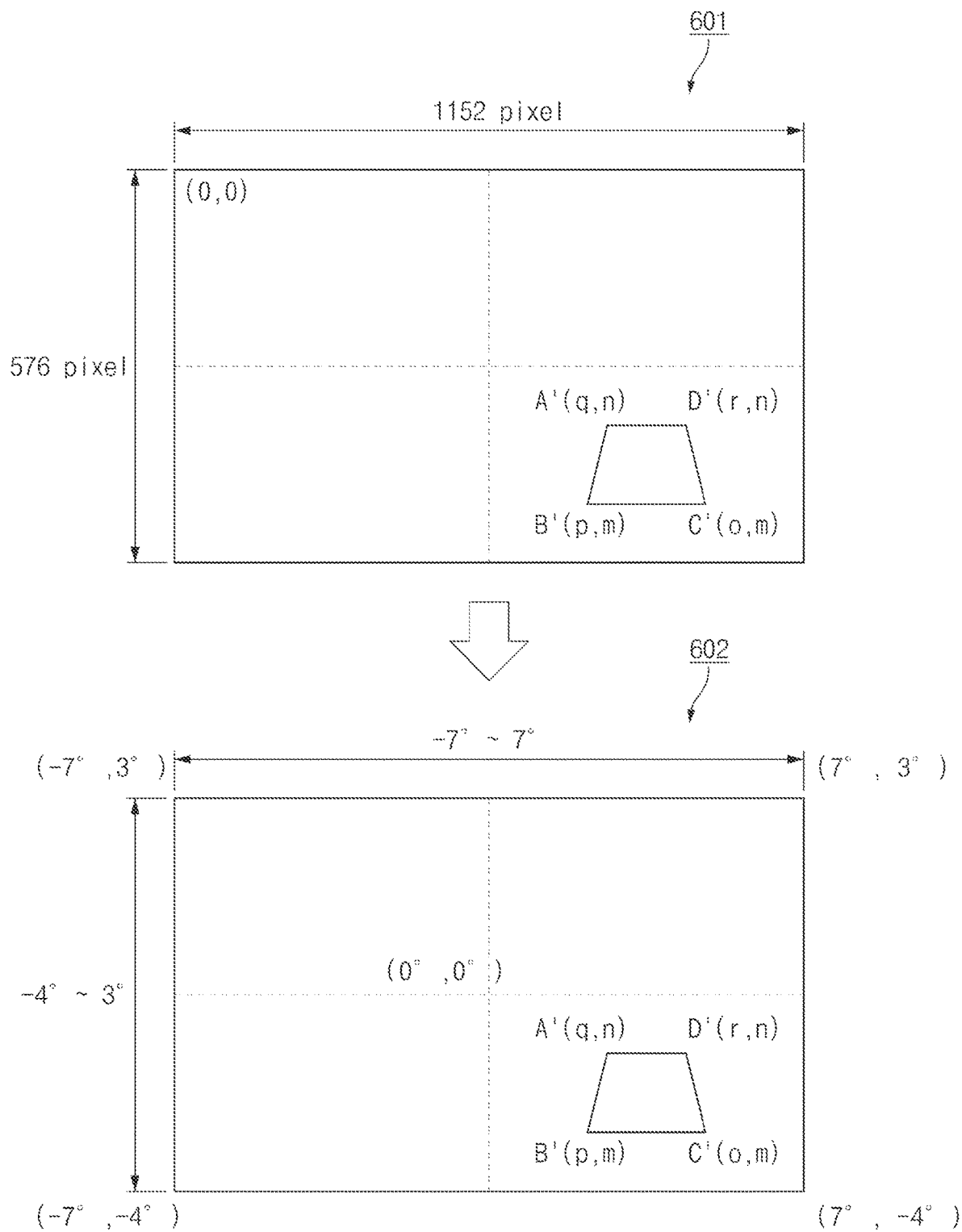
FIG. 6 illustrates an angle coordinate system according to various embodiments.

Referring to FIG. 6, a first coordinate system 601 may represent the first angle coordinates (m, n) and the second angle coordinates (q, p, o, r) of the road surface information 320 on a pixel angle coordinate system, and a second coordinate system 602 may represent a shape and a location when the road surface information 320 is actually emitted on the road on the angle coordinate system. The headlamp controller 126 may apply a pixel value of the headlamp 110 depending on the first angle coordinates (m, n) and the second angle coordinates (q, p, o, r) converted by the coordinate converter 124 to control a location, a shape, a direction, or intensity of the road surface information 320. For example, the headlamp 110 may be formed of 1152 pixels in the horizontal direction and 576 pixels in the vertical direction, and the direction of light may be adjusted according to a pixel value by 14 degrees on the horizontal axis and 7 degrees on the vertical axis. In this case, one pixel may be 0.012 degrees. The number and angles of pixels shown in FIG. 6 and a relationship between the first coordinate system 601 and the second coordinate system 602 may correspond to an example, values thereof may be changed. The central point (0°, 0°) of the second coordinate system 602 may be a point where a vertical line and a horizontal line meet. A low beam may be emitted when a Y-axis angle is negative with respect to the central point (0°, 0°), and a high beam may be emitted when the Y-axis angle is positive with respect to the central point (0, 0).

Figure 7:
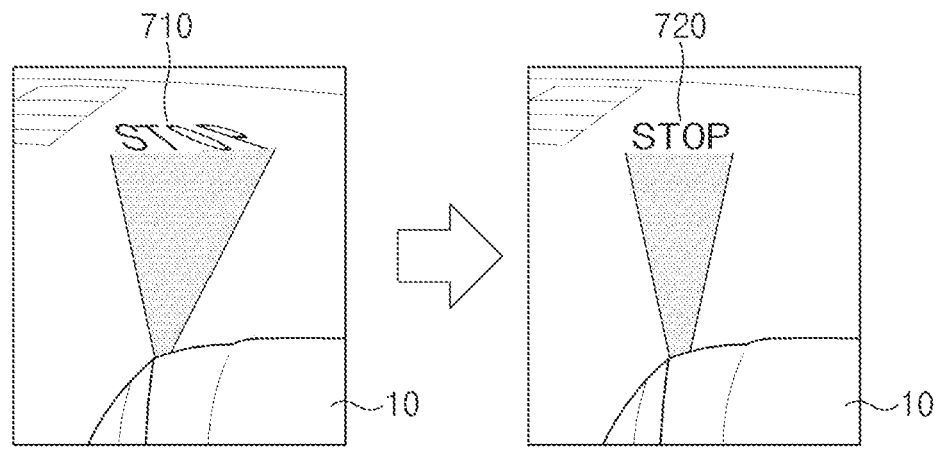
FIG. 7 illustrates an example where distorted road surface information is corrected according to various embodiments.

FIG. 7 illustrates an example where distorted road surface information is corrected according to various embodiments.

Referring to FIG. 7, first road surface information 710 may be road surface information emitted before correction, and second road surface information 720 may be road surface information emitted after the correction. Although a road surface information generator 122 of a vehicle 10 generates rectangular (or square) road surface information, distorted first road surface information 710 may be emitted on the road according to a height where a headlamp 110 is mounted and a distance between left and right headlamps. The vehicle 10 may intentionally deform road surface information by means of a coordinate converter 124 of FIG. 2, such that road surface information is emitted on the road in the form of a rectangle like second road surface information 720.

Figure 8:
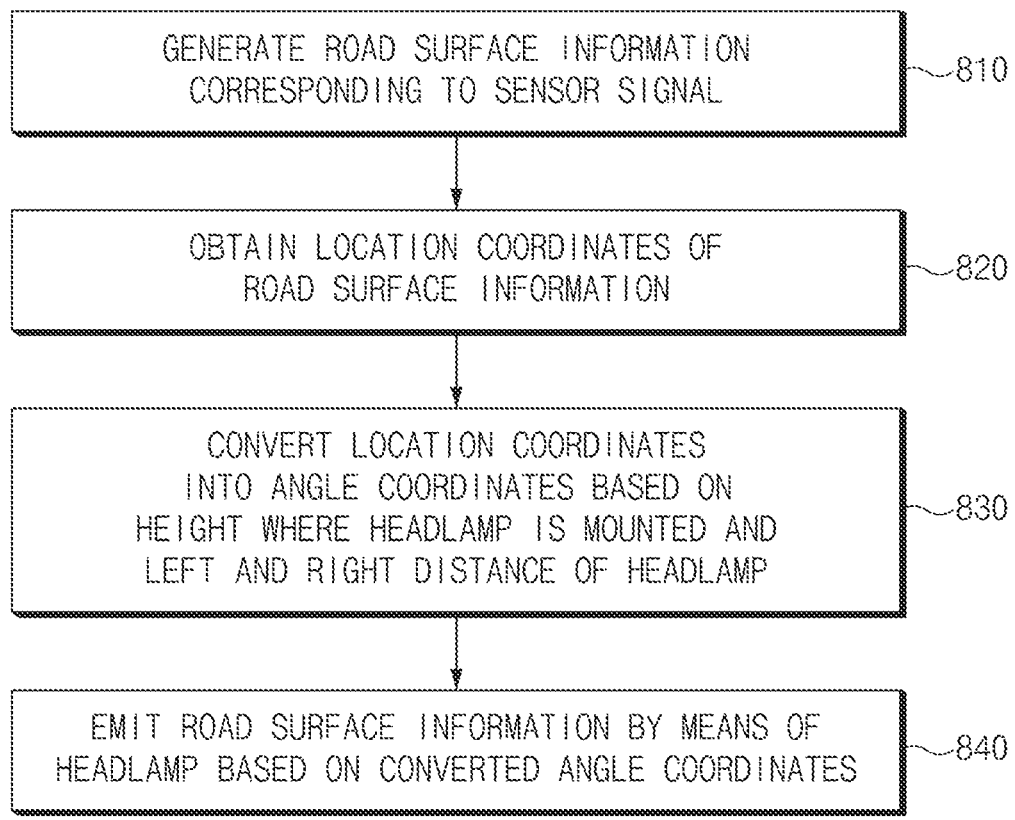
FIG. 8 illustrates an operational flowchart of a vehicle system device for correcting road surface information according to various embodiments.

FIG. 8 illustrates an operational flowchart of a vehicle system device for correcting road surface information according to various embodiments. Operations of the operational flowchart, which will be described below, may be performed by a vehicle system device 100 of FIG. 2 or may be performed by components included in the vehicle system device 100. For example, respective components included in the controller 120 may execute instructions stored in a storage 130 of FIG. 2 to perform a road surface information emission function of the vehicle system device 100.

Referring to FIG. 8, in operation 810, a road surface information generator 122 of FIG. 2 may generate road surface information corresponding to a sensor signal. The sensor signal may be obtained from, for example, various components of the vehicle system device 100. For example, the road surface information generator 122 may receive a sensor signal from at least one sensor which senses a state of a vehicle, an input of a driver, or an external environment.

In operation 820, a coordinate converter 124 of FIG. 2 may obtain location coordinates of the generated road surface information. The location coordinates may refer to, for example, coordinates on an orthogonal coordinate system.

In operation 830, the coordinate converter 124 may convert the location coordinates into angle coordinates using a height where a headlamp 110 of FIG. 2 is mounted and a left and right distance of the headlamp 110. The angle coordinates may refer to, for example, pixel angle coordinates represented with a plurality of pixels of the headlamp 110.

In operation 840, a headlamp controller 126 of FIG. 2 may emit the road surface information by means of the headlamp 110 based on the converted angle coordinates.

Figure 9:
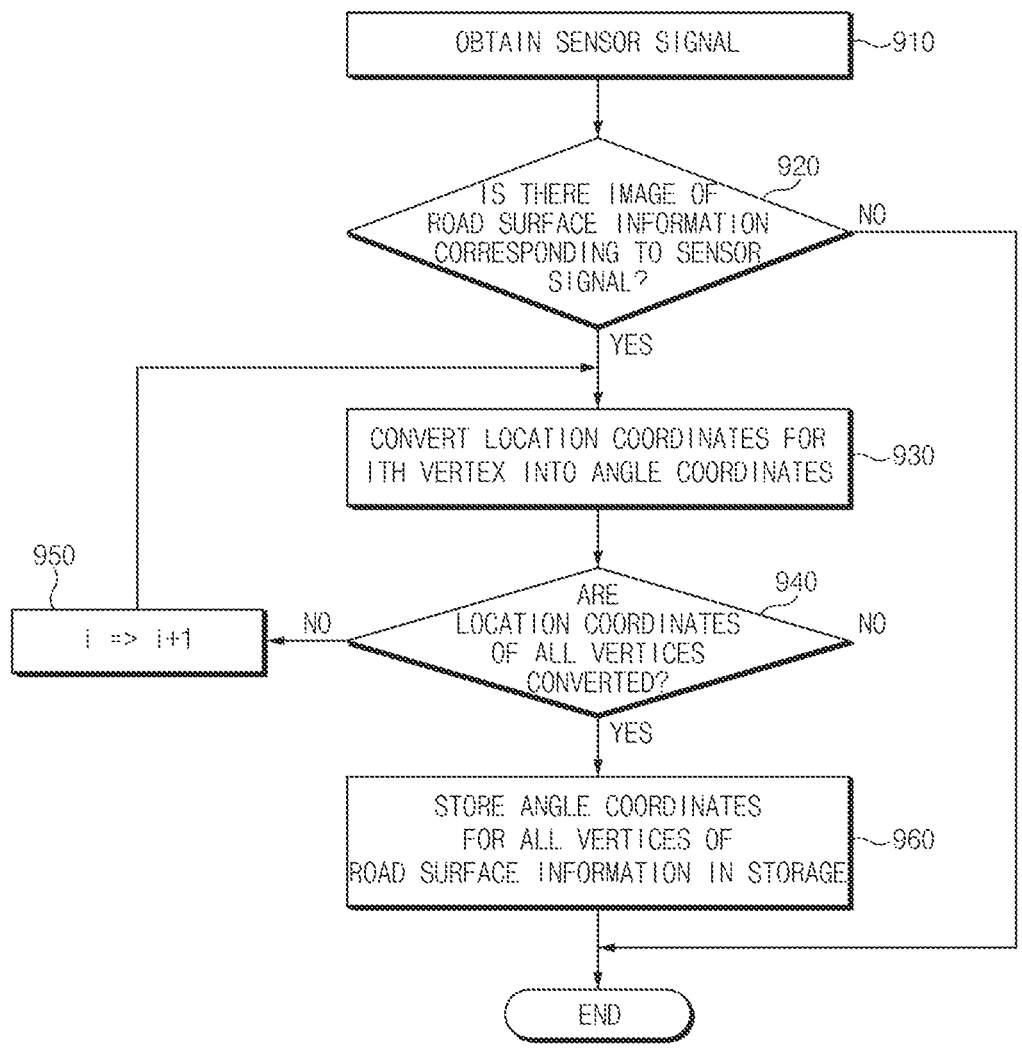
FIG. 9 illustrates another operational flowchart of a vehicle system device for correcting road surface information according to various embodiments.

FIG. 9 illustrates another operational flowchart of a vehicle system device for correcting road surface information according to various embodiments.

Referring to FIG. 9, in operation 910, a road surface information generator 122 of FIG. 2 may obtain a sensor signal. The sensor signal may be generated from at least one sensor based on, for example, a state of a vehicle, an input of a driver, or an external environment.

In operation 920, the road surface information generator 122 may identify whether there is an image of road surface information corresponding to the obtained sensor signal. When there is no image of the road surface information, the road surface information generator 122 may end the algorithm. When there is the image of the road surface information, the road surface information generator 122 may generate road surface information corresponding to the image and may deliver the generated road surface information to a coordinate converter 124 of FIG. 2.

In operation 930, the coordinate converter 124 may convert location coordinates for an (i)th vertex into angle coordinates. Herein, i may refer to a natural number. The angle coordinates may include, for example, first angle coordinates based on a height where a headlamp 110 of FIG. 2 is mounted and second angle coordinates based on a distance between left and right headlamps.

In operation 940, the coordinate converter 124 may identify whether location coordinates of all vertices are converted. When the location coordinates of all the vertices are not converted, the coordinate converter 124 may convert location coordinates for a next vertex (i.e., an (i+1)th vertex) into angle coordinates in operation 930 and operation 950 and may perform operation 940 again. When the location coordinates of all the vertices are converted, in operation 960, the coordinate converter 124 may store the angle coordinates for all the vertices of the road surface information in a storage 130 of FIG. 2. For another example, the coordinate converter 124 may immediately deliver the angle coordinates to the headlamp controller 126 without storing the angle coordinates in the storage 130.

Figure 10:
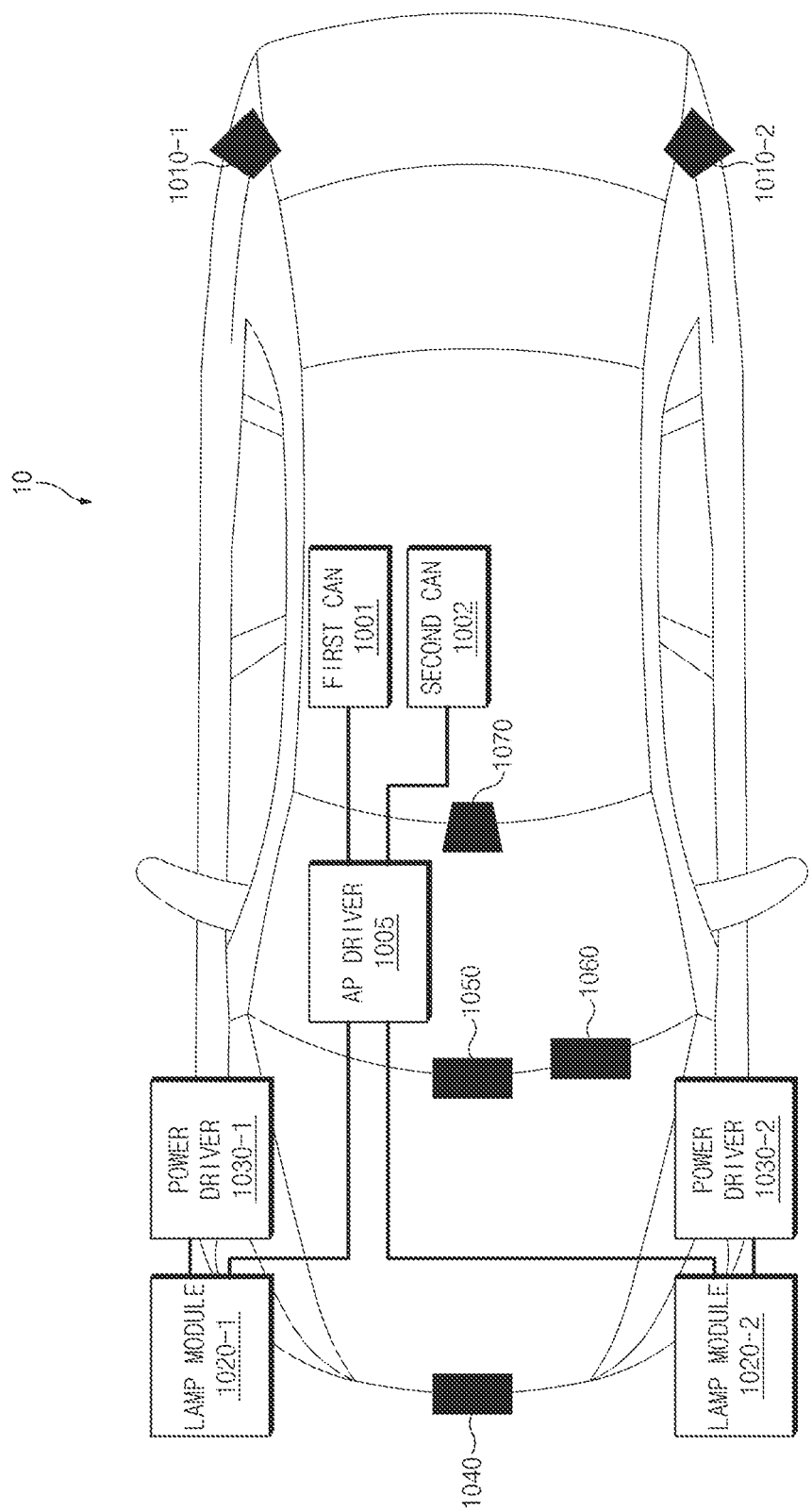
FIG. 10 illustrates a block diagram of a system in a vehicle according to various embodiments.

FIG. 10 illustrates a block diagram of a system in a vehicle according to various embodiments. It may be understood that some of components shown in FIG. 10 correspond to components of a vehicle system device 10 of FIG. 2 and some components are added from the vehicle system device 10.

Referring to FIG. 10, a vehicle 10 (or a vehicle system device 100) may include an application processor (AP) driver 1005, a first controller area network (CAN) 1001, a second CAN 1002, backward sensors 1010-1 and 1010-2, lamp modules 1020-1 and 1020-2, power drivers 1030-1 and 1030-2, a radar 1040, a navigation 1050, a steering 1060, and a camera 1070. In addition, the steering 1060 may be integrally formed with an MF switch.

The AP driver 1005 may be a hardware component corresponding to a controller 120 of FIG. 2. For example, the AP driver 1005 may be a control device for controlling components in the vehicle 10. The AP driver 1005 may be referred to as a processor or an electronic control unit (ECU).

The first CAN 1001 and the second CAN 1002 may be protocols used for the AP driver 1005 to control components in the vehicle 10. For example, the AP driver 1005 may control at least one of the camera 1070, the radar 1040, the rearward sensors 1010-1 and 1010-2, and the navigation 1050 over the first CAN 1001 to perform sensing of the vehicle 10 and a function according to the sensing and may control the steering 1060 (including the MF switch), a brake (not shown), and a speed of the vehicle 10 over the second CAN 1002 to control a function associated with driving of the vehicle 10. The first CAN 1001 may be referred to as a private CAN (P-CAN), and the second CAN 1002 may be referred to as a chassis CAN (C-CAN).

The backward sensors 1010-1 and 1010-2 may be configured to sense a blind spot (e.g., a rear side of the vehicle 10) a driver of the vehicle 10 does not detect. The backward sensors 1010-1 and 1010-2 may be referred to as blind spot detection (BSD). The number and locations of the backward sensors 1010-1 and 1010-2 are not limited to the example shown in FIG. 10.

The lamp modules 1020-1 and 1020-2 may correspond to a headlamp 110 of FIG. 2. According to an embodiment, the lamp module 1020-1 may include a digital micro-mirror device (DMD) lamp including a plurality of micro mirrors, such that the vehicle 10 may more minutely adjust intensity and a direction of light. According to an embodiment, each of the lamp modules 1020-1 and 1020-2 may be connected with the AP driver 1005 through a coaxial cable (e.g., a Fakra cable). Each of the power drivers 1030-1 and 1030-2 may be configured to supply power to each of the lamp modules 1020-1 and 1020-2.

The radar 1040 may be configured to detect an object located in front of the vehicle 10. For example, the AP driver 1005 may detect a location, a speed, or a direction of an object (e.g., a pedestrian or an obstacle) using the radar 1040.

The camera 1070 may obtain an image in front of the vehicle 10. The AP driver 1005 may analyze an image obtained by the camera 1070 to detect a location, a speed, a direction, a shape, or a size of an object located in front of the vehicle 10.

Figure 11:
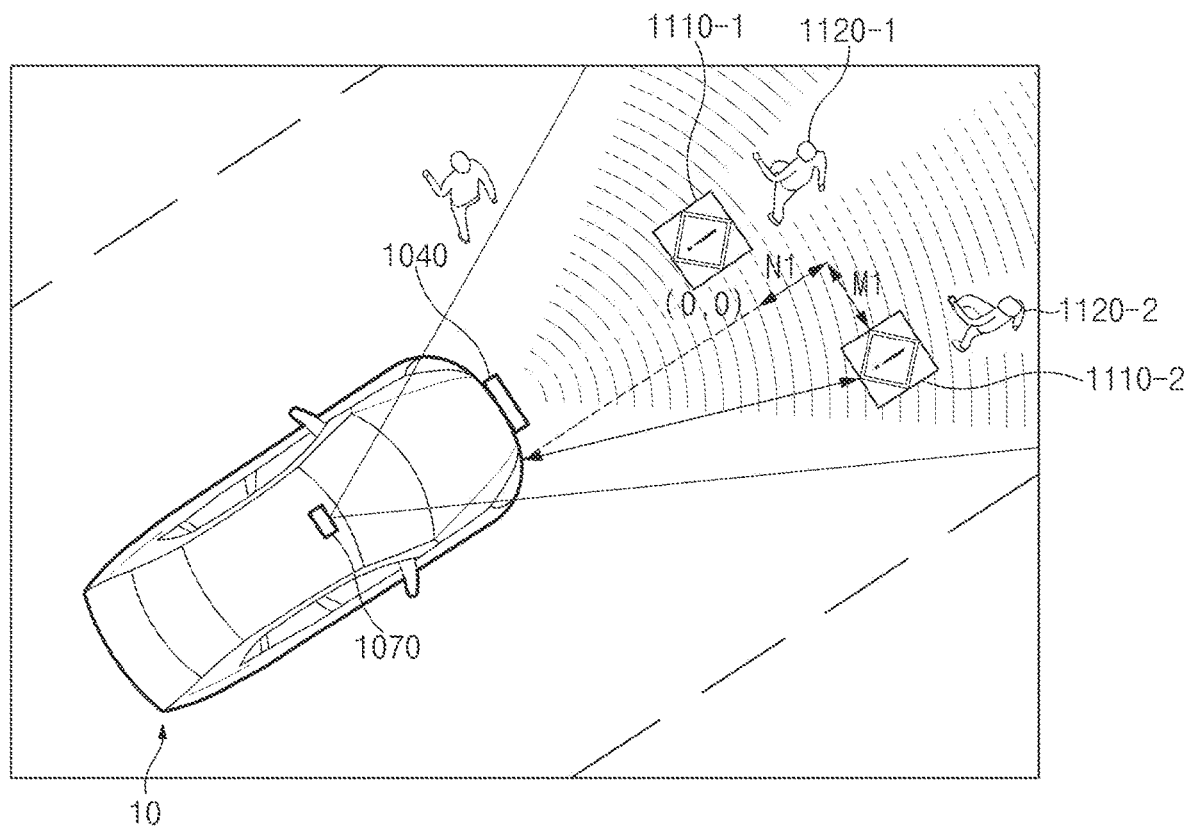
FIG. 11 illustrates an operation of emitting road surface information depending on a detected object according to various embodiments.

FIG. 11 illustrates an operation of emitting road surface information depending on a detected object according to various embodiments.

Referring to FIG. 11, a vehicle 10 may detect an object (e.g., pedestrians 1120-1 and 1120-2) located in front of the vehicle 10 using a camera 1070 or a radar 1040.

According to an embodiment, a headlamp controller 126 of FIG. 2 may control a headlamp 110 of FIG. 2 to emit a plurality of pieces of road surface information based on the number of the detected objects. For example, when the first object 1120-1 and the second object 1120 are detected, the headlamp controller 126 may control the headlamp 110 to emit first road surface information 1110-1 and second road surface information 1110-2 respectively corresponding to the detected objects.

According to an embodiment, the headlamp controller 126 may change a location of road surface information based on a location of the detected object. For example, when the second object 1120-2 is detected, the headlamp controller 126 may change a location where the second road surface information 1110-2 is displayed by specified distances M1 and N1 from a reference point (0, 0) depending on a location of the second object 1120-2.

According to embodiments disclosed in the present disclosure, the vehicle system device may more accurately emit road surface information using the headlamp.

According to embodiments disclosed in the present disclosure, the vehicle system device may correct the displaying of road surface information using its software, thus expecting increased productivity at the same time as increasing technical accuracy.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for emitting road surface information for a vehicle, comprising:
    a lamp pair;
    a data storage storing lamp configuration information including a mounting height of the lamp pair and a lateral distance between the lamp pair; and
    a controller configured to:
        generate the road surface information;
        determining an angle for emitting the road surface information based on (1) the lamp configuration information and (2) location coordinates of the road surface information; and
        control the lamp pair to emit the road surface information at the determined angle.

2. The system of claim 1, wherein the controller is further configured to:
    calculate a first angle of the road surface information based on the mounting height of the lamp pair; and calculate a second angle of the road surface information based on the lateral distance between the lamp pair and the location coordinates of the road surface information.

3. The system of claim 2, wherein the controller is further configured to:
calculate the first and second angles for a location of an (i)th vertex of the road surface information, where "i" is a natural number;
calculate the first and second angles for a location of an (i+l)th vertex of the road surface information when a plurality of locations of entire vertices of the road surface information is not converted; and
store, in the data storage, the first and second angles for a plurality of locations of the entire vertices of the road surface information when the plurality of locations of the entire vertices of the road surface information is converted.

4. The system of claim 2, wherein, to control the lamp pair, the controller is further configured to apply a pixel value to a pixel of the lamp pair corresponding to the first and second angles.

5. The system of claim 1, further comprising a sensor, wherein the controller is configured to generate the road surface information based on a sensor signal generated by the sensor.

6. The system of claim 5, wherein the controller is further configured to:
determine whether there is an image of the road surface information corresponding to the sensor signal; and
in response to determining that there is the image of the road surface information, generate the road surface information.

7. The system of claim 1, further comprising a sensor configured to detect an object in front of the vehicle,
wherein the controller is configured to:
determine, based on a sensor signal from the sensor, whether an object is present in front of the vehicle;
in response to determining that the object is present in front of the vehicle, control the lamp pair to emit the road surface information.

8. The system of claim 7, wherein the controller is further configured to control the lamp pair to emit the road surface information corresponding to each of one or more objects detected by the sensor.

9. The system of claim 7, wherein the controller is further configured to:
change an emitting position of the road surface information based on a location of the detected object; and
control the lamp pair to emit the road surface information to the changed emitting position.

10. A method for emitting road surface information for a vehicle, comprising:
generating road surface information;
obtaining location coordinates of the road surface information;
calculating an angle based on (1) the location coordinates of the road surface information and (2) lamp configuration information including a mounting height of a lamp pair and a lateral distance between the lamp pair; and
controlling the lamp pair to emit the road surface information based on the calculated angle.

11. The method of claim 10, wherein calculating the angle includes:
calculating, based on the mounting height of the lamp pair and the location coordinates of the road surface information, a first angle of the road surface information; and
calculating, based on the lateral distance between the lamp pair, a second angle of the road surface information.

12. The method of claim 11, wherein calculating the first and second angles includes:
calculating the first and second angles for a location of an (i)th vertex of the road surface information, where "i" is a natural number;
calculating the first and second angles for a location of an (i+l)th vertex of the road surface information when a plurality of locations of entire vertices of the road surface information is not converted; and
storing, in a data storage, the first and second angles of for the plurality of locations of the entire vertices of the road surface information when the plurality of locations of the entire vertices of the road surface information are converted.

13. The method of claim 11, wherein controlling the lamp pair includes applying a pixel value to a pixel of the lamp pair corresponding to the first and second angles.

* * * * *